H. P. KRAFT.
DUST CAP.
APPLICATION FILED DEC. 17, 1914.

1,357,500.

Patented Nov. 2, 1920.

INVENTOR:
Henry P. Kraft,
By Attorneys,

UNITED STATES PATENT OFFICE.

HENRY P. KRAFT, OF RIDGEWOOD, NEW JERSEY.

DUST-CAP.

1,357,500.  Specification of Letters Patent.  Patented Nov. 2, 1920.

Application filed December 17, 1914. Serial No. 877,793.

*To all whom it may concern:*

Be it known that I, HENRY P. KRAFT, a citizen of the United States, residing in Ridgewood, in the county of Bergen and State of New Jersey, have invented certain new and useful Improvements in Dust-Caps, of which the following is a specification.

This invention relates to dust caps for tire valves or the like, and aims to provide certain improvements therein.

In the usual form of tire valve the valve casing protrudes inwardly from the rim to a greater or less degree, and it is customary to provide a cap for screwing over the casing in order to protect it from dust, injury, etc. Such dust caps have customarily been formed to screw onto the casing, but this has required a long screwing operation in applying and removing the cap. It is customary in the use of such valves to provide a so-called rim washer which is arranged in position next the felly or rim, and which is usually provided with a packing of leather or similar material, and a so-called rim nut which screws against the rim washer and holds the latter in place.

According to the present invention I provide a dust cap which is adapted to engage the rim washer and inclose the rim nut. I also prefer to provide a quickly detachable connection between the rim washer and dust cap so that the latter may be speedily applied and removed. The invention also includes a rim washer and rim nut formed as a unitary structure and capable of swiveling one upon the other.

In the drawings which illustrate several forms of the invention,—

Figure 1 is a side elevation of a tire valve having the improved dust cap applied thereto, the cap being shown in longitudinal section.

Fig. 2 is a top view of the cap.

Fig. 3 is a side elevation thereof.

Fig. 4 is a side elevation of the combined rim washer and rim nut.

Fig. 5 is a plan of Fig. 4.

Fig. 6 is a section of Fig. 4 on the line 6—6.

Fig. 7 is a plan of the packing ring.

Fig. 8 is a view partly in section of a modified form of cap.

Fig. 9 is a top or plan view of the cap of Fig. 8.

Fig. 10 is a sectional view of the line 10—10 in Fig. 8, the packing ring being omitted.

Fig. 11 is an elevation of the rim washer.

Fig. 12 is a bottom plan of Fig. 11.

Fig. 13 is a view of the packing.

Fig. 14 is a plan view of the rim nut shown in Fig. 8.

Fig. 15 is a side elevation of Fig. 14.

Fig. 16 is a section of a modification.

Referring first to Fig. 1, let A indicate a tire tube to which is connected the tire valve B, which latter passes through the felly C and projects beyond the same. According to the present invention a rim washer E is provided which preferably carries a packing washer F, the latter being designed to bear against the felly as shown. For the purpose of tightening the rim washer against the felly, a rim nut G is provided. Preferably the rim washer is made of sheet metal stamped as shown, and the rim nut also may be made of sheet metal. By preference the rim washer and rim nut are swiveled together as shown best in Fig. 1, in which construction the rim nut may be provided with a flange E' extending outwardly over the body of the rim washer.

According to another feature of the present invention the dust cap H is adapted to engage the rim washer for the purpose of holding it in place. By this construction the rim nut is inclosed within the dust cap and dust and dirt is hence prevented from packing around the threads of the nut. Any suitable means of engagement may be employed between the cap and rim washer, but preferably such engaging means are quickly operable. As shown in Figs. 1 to 7 the rim washer is provided with a groove I in which is seated a split ring J (Fig. 4). The depth of the groove is such that the ring projects beyond it, and the ring is capable of some compression within the groove. The cap H in this construction is provided with an enlarged foot K, the lower end of which is formed with an internal groove L which is adapted to fit over the ring J, and thus securely hold the cap in place. Preferaby the rim washer is formed with a cylindrical face M outwardly of the ring J, and the foot K of the cap is also preferably formed with a wall N which provides a similar internal face. By these two faces which fit closely the cap is prevented from tilting in use, and a reasonably tight joint is provided between the parts.

By another feature of the invention the cap H is adapted to be used as a wrench to screw down the rim nut. To this end the cap is formed with a portion O of hexagon shape, or other shape conforming to that of the nut, and the inner wall of the portion O is hence adapted to fit over the nut as shown in Fig. 1. When so fitted the nut may be rotated to tighten or loosen the rim washer by means of the cap, the cap being preferably provided with a series of raised ribs P which provide a very secure hand-hold, whereby a very much more powerful rotative movement can be given to the nut than would be possible if the nut were grasped directly by the fingers. This construction hence dispenses with the use of a wrench for this purpose. The portion O also assists the dust cap in holding its position.

In the act of applying, the cap is simply pressed down over the rim nut and rim washer until the ring J is compressed sufficiently to permit it to pass into the groove L, whereupon it expands and forms a lock to hold the dust cap in place. A quick longitudinal movement, however, is sufficient to remove the cap.

In Figs. 8 et seq. is illustrated a similar construction except that the rim washer Q is formed with a screw-threaded flange R which is adapted to engage a similar screw-threaded portion S formed on the interior of the cap. The rim nut illustrated at T may be a plain hexagonal or other nut. In this construction since the cap is applied by a rotative movement, it is very desirable that the rim washer should be held against rotation on the valve, and this is best accomplished by providing the rim washer with an oblong hole U, the flats of which are adapted to fit over the flat portions V of the valve casing.

In this construction the rim nut and rim washer may be separate, or they may be swiveled together, as illustrated for instance in Fig. 16 wherein the washer and nut are provided with inter-engaging flanges.

While I have described my invention with relation to dust caps, it will be understood that it will be applicable to other devices of a similar nature.

While I have shown and described several embodiments of the invention, it will be understood that I do not wish to be limited thereto, since various changes may be made therein without departing from the spirit of the invention.

What I claim is:—

1. The combination of a dust cap and a rim washer, and means for holding the latter in fixed relation to a valve casing, said rim washer and dust cap having inter-engaging means by which the cap may be detachably held by the washer.

2. The combination of a dust cap and a rim washer, and means for holding the latter in fixed relation to a valve casing, said rim washer and dust cap having quickly operable engaging means by which the cap may be held by the washer.

3. The combination of a dust cap and a rim washer, and means for holding the latter in fixed relation to a valve casing, the rim washer having a ring and the dust cap having a portion adapted to fit over said ring.

4. The combination of a dust cap and a rim nut, said parts having non-rotative inter-engaging means by means of which the nut may be rotated in either direction by the cap.

5. The combination of a dust cap and a rim nut, the rim nut having external wrench faces, and the dust cap having internal wrench faces adapted to engage those of the nut.

6. A dust cap having a recess adapted to wholly receive a rim nut, and non-connectively inclose the same.

7. The combination of a rim nut and a dust cap adapted to fit over and non-connectively and wholly inclose said nut.

8. The combination of a rim nut and a rim washer and a dust cap, the dust cap having means for engaging the rim washer and being adapted to inclose the rim nut.

9. The combination of a rim washer, a rim nut, and a dust cap, the dust cap having quickly detachable means for engaging the rim washer, and the dust cap being adapted to inclose the rim nut.

10. The combination of a rim washer, a rim nut, and a dust cap, the dust cap having means for engaging the rim washer, and the dust cap having inwardly of such means a recess adapted to receive the rim nut.

11. The combination with a valve casing having an externally-arranged valve part encircling it, which valve part has a non-circular face, and a dust cap having a wrench face for turning said part.

12. A dust cap having an internal wrench face.

13. A dust cap having at its inner end a recess adapted to fit over and wholly inclose a rim nut, and having inwardly of such nut a portion extending beyond said rim nut.

14. The combination of a rim nut and a dust cap, the dust cap having at its inner end a recess adapted to fit over and wholly inclose a rim nut, and having inwardly of such nut a portion extending beyond said rim nut.

15. A dust cap having at its inner end a recess adapted to fit over and wholly inclose a rim nut, and having inwardly of such nut a portion extending beyond said rim nut, and said dust cap having at such portion means for engagement with another part.

16. The combination of a dust cap, a part adapted to be engaged by said dust cap, said part having a passage through which the valve casing fits loosely, and a nut located within said cap and bearing against said part for drawing the valve casing inwardly to its seat.

17. The combination of a dust cap, a part encircling the valve casing inward of said dust cap, said part and dust cap having quickly detachable means for engaging each other, and a nut located within said dust cap and bearing against said part for drawing the valve casing to its seat.

In witness whereof, I have hereunto signed my name in the presence of two subscribing witnesses.

HENRY P. KRAFT.

Witnesses:
E. V. MYERS,
FRED WHITE.